(12) United States Patent
Lin

(10) Patent No.: US 6,813,940 B2
(45) Date of Patent: Nov. 9, 2004

(54) DETECTING UNIT WITH A RESET DEVICE FOR DETECTING PRESSURE IN A TIRE OF A VEHICLE

(75) Inventor: Sheng-Hsiung Lin, Kaohsiung (TW)

(73) Assignee: Lite-On Automotive Corp., Kaohsiung (TW)

( * ) Notice: Subject to any disclaimer, the term of this patent is extended or adjusted under 35 U.S.C. 154(b) by 47 days.

(21) Appl. No.: 10/341,035

(22) Filed: Jan. 13, 2003

(65) Prior Publication Data

US 2004/0045347 A1 Mar. 11, 2004

(30) Foreign Application Priority Data

Sep. 10, 2002 (TW) ........................................ 91214172 U

(51) Int. Cl.[7] .............................................. B60C 23/02
(52) U.S. Cl. ...................................................... 73/146.3
(58) Field of Search .............................. 73/146, 146.3, 73/146.8; 340/442–447

(56) References Cited

U.S. PATENT DOCUMENTS 6,175,302 B1 * 1/2001 Huang ........................ 340/442

* cited by examiner

*Primary Examiner*—William Oen
(74) *Attorney, Agent, or Firm*—Alan D. Kamrath; Nikolai & Mersereau, P.A.

(57) ABSTRACT

A detecting unit has a housing with a chamber, a cover, an air valve, a circuit board, a detecting assembly and a ground. The cover is attached to the housing to close the chamber. The circuit board is received in the chamber of the housing and has a signal processing unit mounted on the circuit board. The signal processing unit has a reset terminal. The ground is mounted on the circuit board and is electrically connected to the air valve. Accordingly, the signal processing unit will be reset when the reset terminal is electrically connected to the air valve.

6 Claims, 5 Drawing Sheets

US 6,813,940 B2

DETECTING UNIT WITH A RESET DEVICE FOR DETECTING PRESSURE IN A TIRE OF A VEHICLE

BACKGROUND OF THE INVENTION

1. Field of the Invention

The present invention relates to a detecting unit, and more particularly to a detecting unit for detecting pressure in a tire of a vehicle and with a reset device.

2. Description of Related Art

When the pressure in the tire of the vehicle is lowered because the tire is punctured etc, the driver cannot steer the vehicle in stable manner and the tire easily explodes so as to cause danger. Therefore, a pressure detecting device is mounted in the tire of the vehicle to detect the pressure in the tire. With the detecting device, an alarm will generate to alert the driver when the pressure in the tire is over or lower than a desired level.

A first conventional detecting device is shown in a Taiwan Utility Model Patent with an issue number 392,604, entitled "Wireless Detecting Device For Detecting Pressure In Tires". The first conventional detecting device comprises a detecting unit with a signal transmitter and a control unit with a signal receiver. The detecting unit is received in a tire of the vehicle to measure the pressure in the tire and send the pressure data to the control unit. The control unit is mounted near the steering wheel of the vehicle and shows the information about the pressure of tire to the driver.

A second conventional detecting device is shown in a Taiwan Utility Model Patent with an issue number 323,600, entitled "Circuit Device Of An Alarming Device For Pressure In Tires". The conventional detecting device has a detecting unit attached to the air valve of the tire of the vehicle so as to simplify the structure of the detecting unit of the conventional detecting device.

A third conventional detecting device is shown in a Taiwan Utility Model Patent with an issue number 404,354, entitled "Electric Power Mounting Structure For A Concealed Invisible Detecting Device For Pressure In Tires". The third conventional detecting device is mounted on the rim of a wheel so as to be concealed.

The conventional detecting devices as described above are always preset to fit with different types or models of vehicle. However, when the signal sent out from the conventional detecting unit is wrong, the detecting unit of the conventional detecting device cannot be reset. The conventional detecting unit must be replaced with a new one.

To overcome the shortcomings, the present invention tends to provide a detecting unit to mitigate or obviate the aforementioned problems.

SUMMARY OF THE INVENTION

The main objective of the invention is to provide a detecting unit for detecting pressure in the tires of a vehicle and that can be reset when a malfunction occurs in the detecting unit. The detecting unit has a housing with a chamber, a cover, an air valve, a circuit board, a detecting assembly and a ground. The circuit board is received in the chamber of the housing and has a signal processing unit mounted on the circuit board. The signal processing unit has a reset terminal. The ground is mounted on the circuit board and is electrically connected to the air valve. Accordingly, the signal processing unit will be reset when the reset terminal is electrically connected to the air valve.

Other objects, advantages and novel features of the invention will become more apparent from the following detailed description when taken in conjunction with the accompanying drawings.

DETAILED DESCRIPTION OF PREFERRED EMBODIMENT

Figure 1:
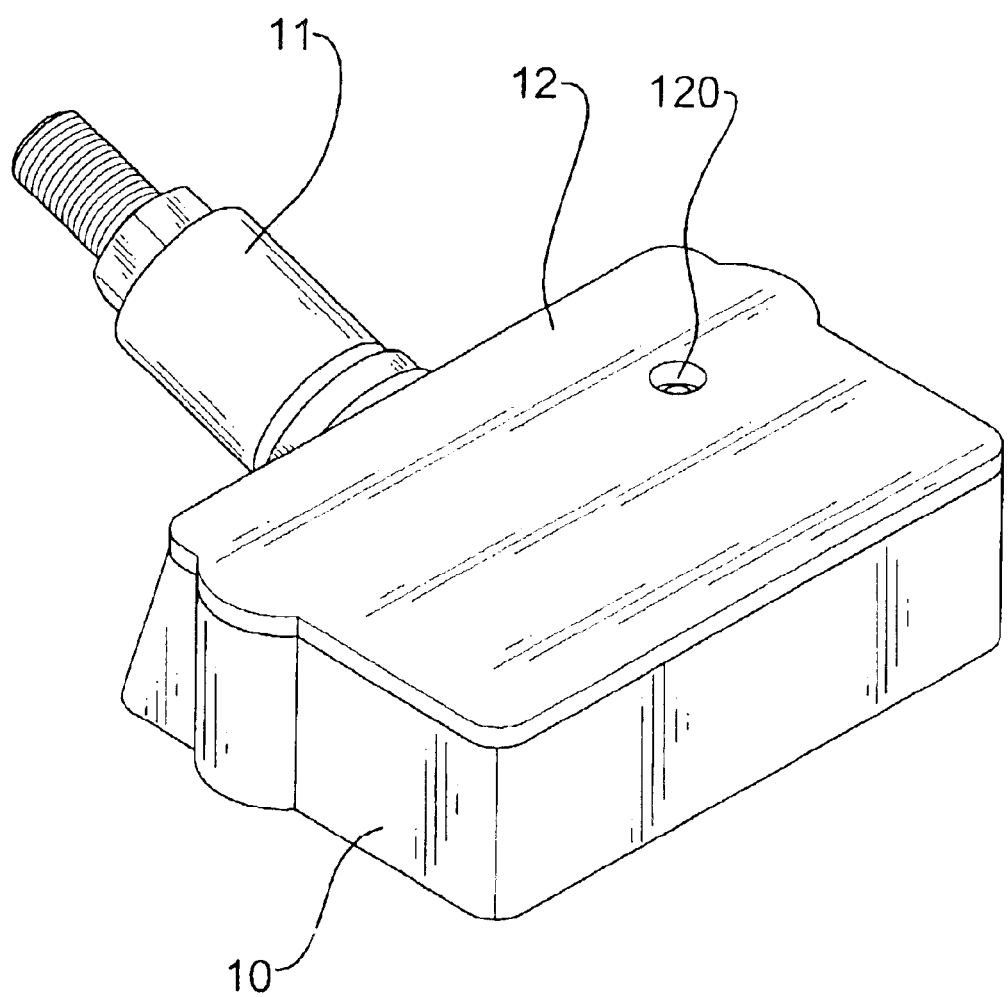
FIG. 1 is a perspective view of a detecting unit in accordance with the present invention.
Figure 2:
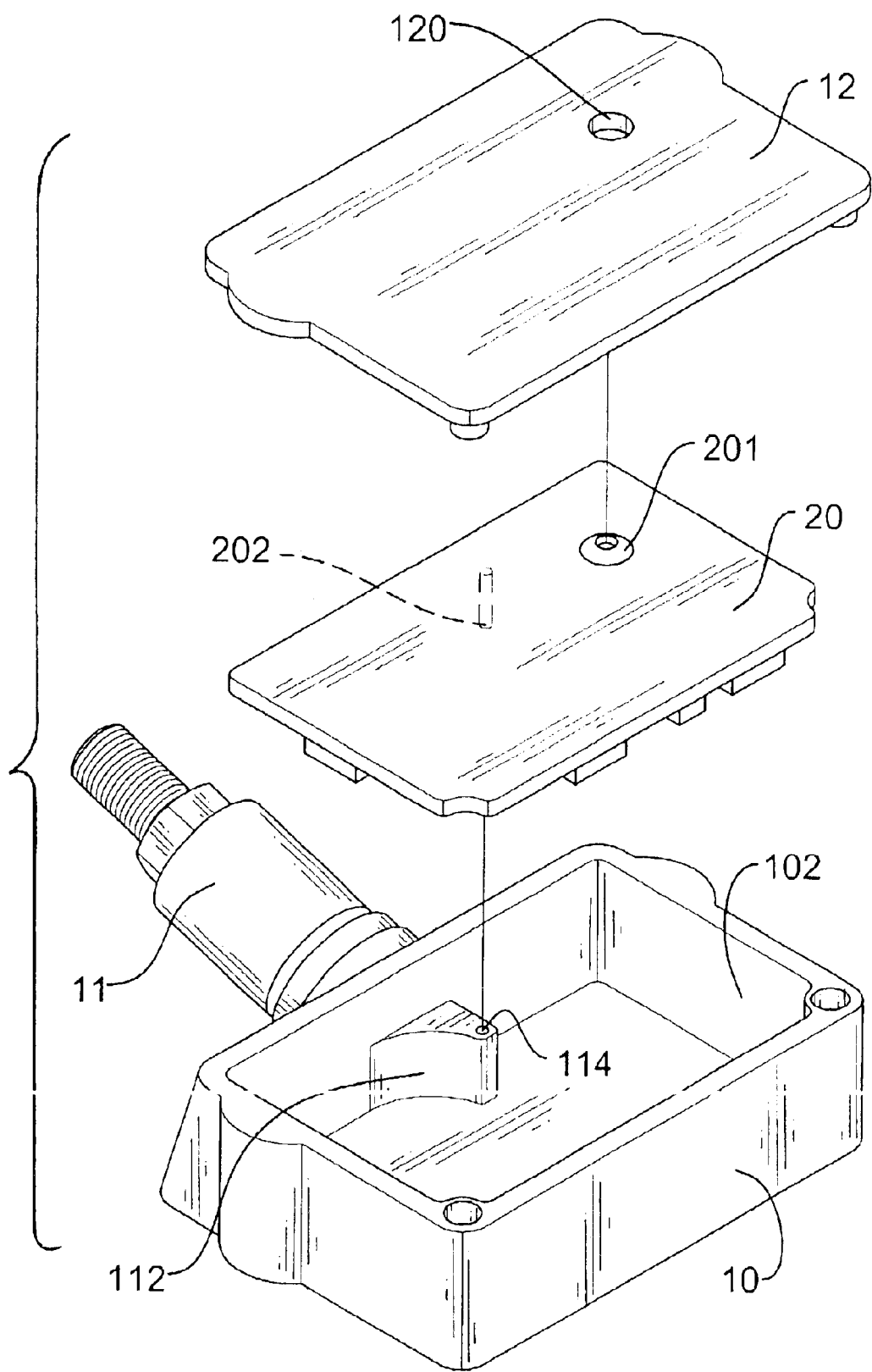
FIG. 2 is an exploded perspective view of the detecting unit in FIG. 1.
Figure 3:
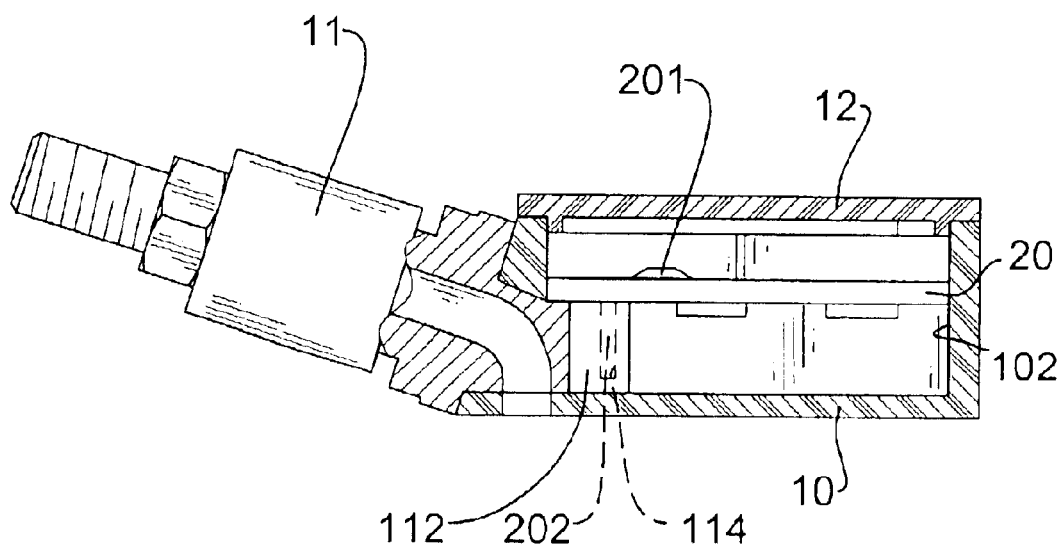
FIG. 3 is a side plan view in partial cross section of the detecting unit in FIG. 1.

With reference to FIGS. 1 to 3, a detecting unit in accordance with the present invention comprises a housing (10), a cover (12), an air valve (11) and a circuit board (20). The detecting unit is received in a tire of a vehicle to detect the pressure in the tire. The housing (10) is received in the tire and has a chamber (102) defined in the top of the housing (10). A through hole (not numbered) is defined through an end of the housing (10) and is not communicated with the chamber (10). The cover (12) is attached to the housing (10) to close the chamber (102), and a bore (120) is defined in the cover (12). The air valve (11) is attached in the through hole of the housing (10) and has an extension (112) extending into the chamber (102) of the housing (10). A hole (114) is defined in the top of the extension (112). The air valve (11) extends out from the tire and has a passage (not numbered) defined through the air valve (11), such that air can be pumped into the tire through the passage in the air valve (11).

Figure 5:
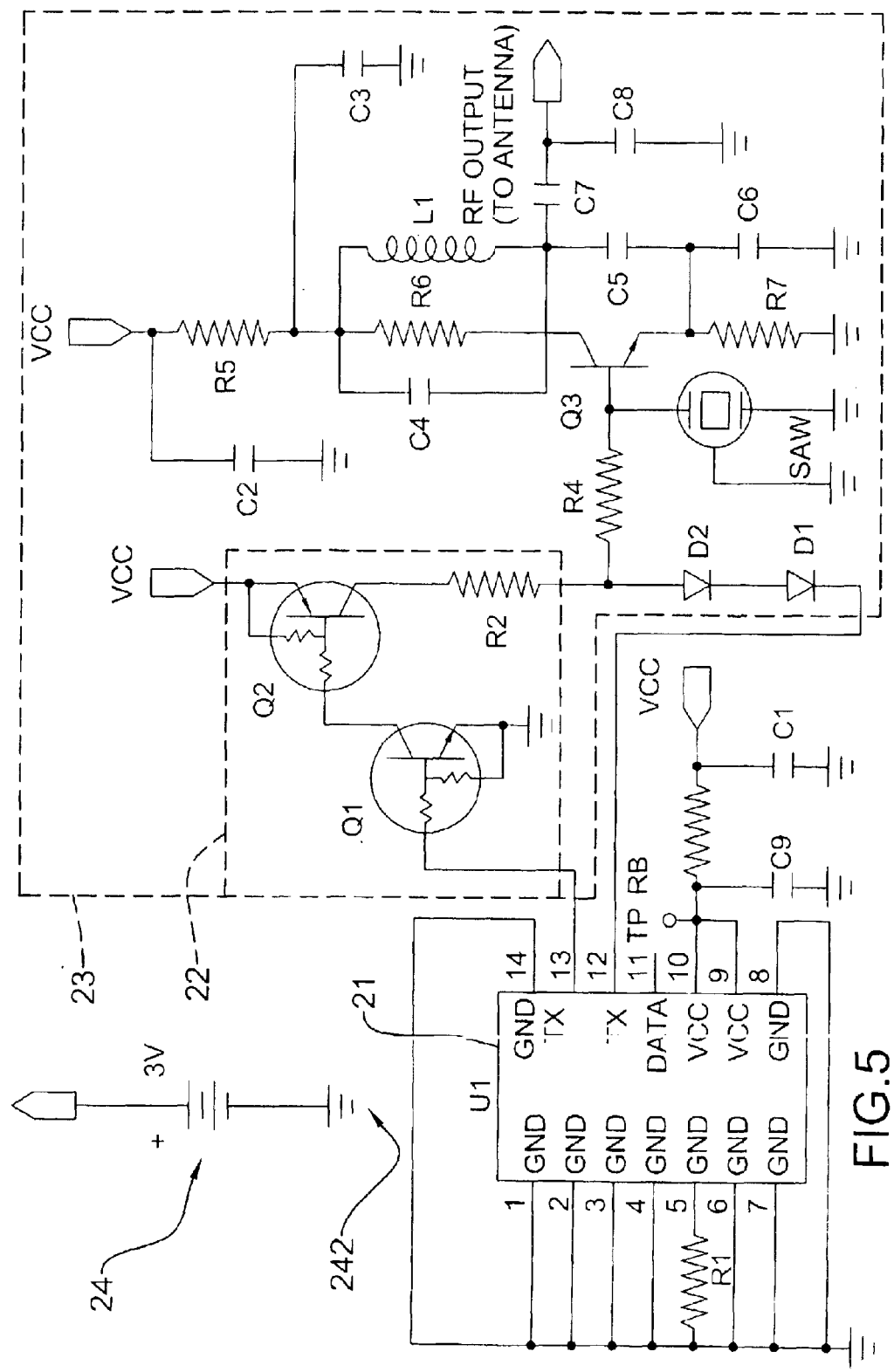
FIG. 5 is a circuit diagram of the circuit mounted on the circuit board of the detecting unit in FIG. 2.

The circuit board (20) is received in the chamber (102) of the housing (10) and has a circuit arranged on the circuit board. With reference to FIG. 5, the circuit has a signal processing unit (21), a detecting assembly and a power supply (24). The signal process unit (21) has a reset terminal (leg 11 TP as shown in FIG. 5). A hole (not numbered) is defined in the circuit board (20) and aligns with the bore (120) in the cover (12). A metal knob (201) is attached to the hole and is electrically connected to the reset terminal on the signal processing unit (21). The detecting assembly is adapted to measure pressure in one of the tires of the vehicle and comprises a detector and a wireless transmitting unit. The detector is mounted in the signal processing unit (21) to detect the pressure in the tire. The wireless transmitting unit is mounted on the circuit on the circuit board (20) and is electrically connected to the detector. The wireless transmitting unit comprises an amplifier (22), an oscillating circuit (23) and a transmitter (not shown). The amplifier (22) is electrically connected to the detector. The oscillating circuit (23) is electrically connected to the amplifier (22), and the transmitter is electrically connected to the oscillating circuit (23). With the wireless transmitting unit, the pressure signal detected by the detector will be sent to a controller.

The power supply (24) is electrically connected to the signal processing unit (21) to provide the electrical power to the signal processing unit and the detecting assembly. The power supply (24) has a ground (242) electrically connected to the air valve (11). In practice, a metal stub (202) is attached to the circuit board (20) and is electrically connected to the ground (242). When the circuit board (20) is received in the chamber (102) in the housing (10), the stub (202) will be pressed into the hole (114) in the extension (112) so that the ground (242) is electrically connected to the air valve (11) through the stub (202) and the extension (112).

In use, the housing (10) is received and positioned in the tire. Because the bore (120) is defined in the cover (12), the high-pressured air in the tire will enter into the chamber (102) of the housing (10) through the bore (120) in the cover (12). Consequently, the detector in the signal processing unit (21) can measure the pressure in the tire and send the pressure signal to the controller through the wireless transmitting unit. The vehicle driver can read information about the tires from a display of the controller.

Figure 4:
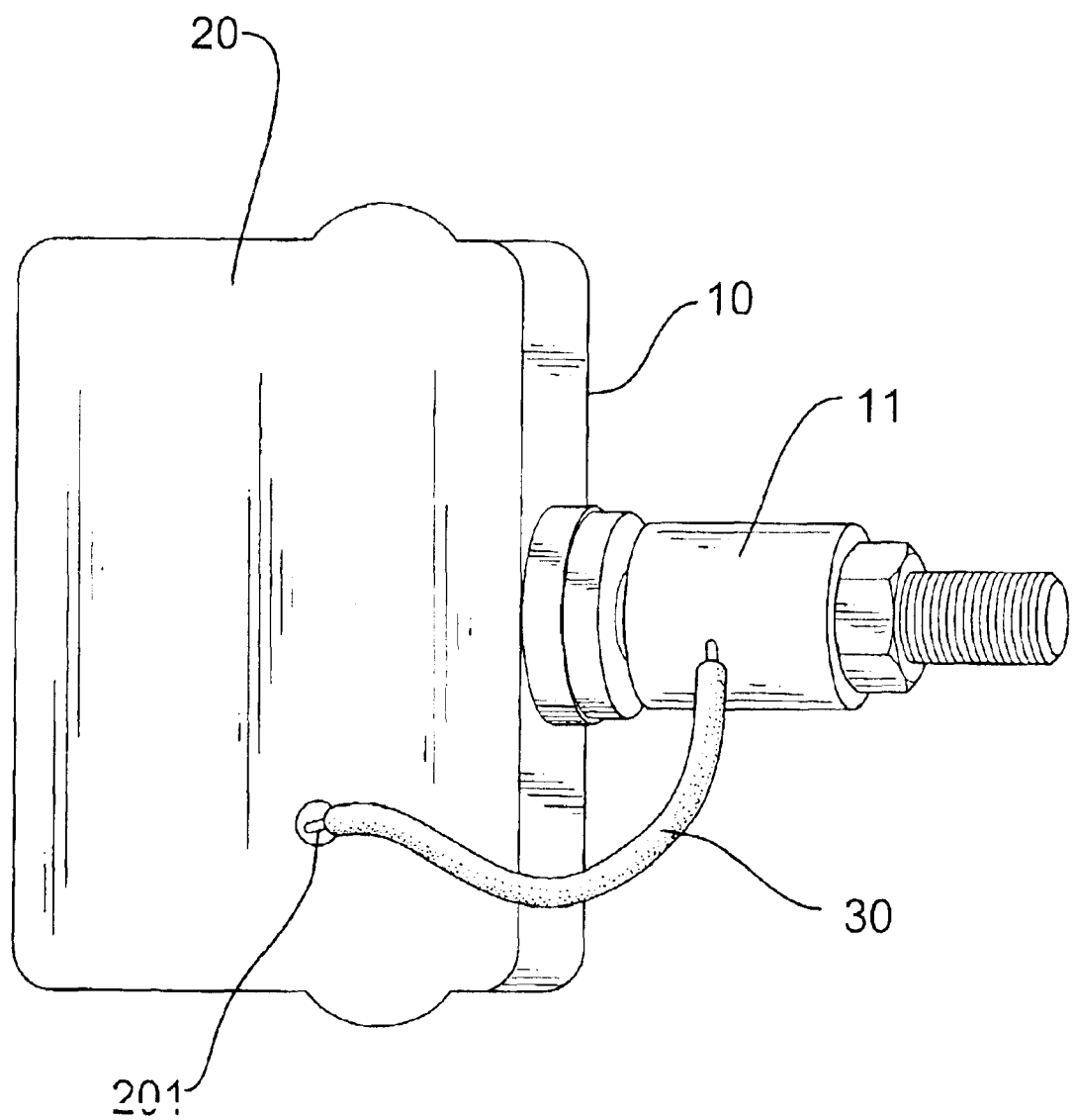
FIG. 4 is an operational top plan view of the detecting unit in FIG. 1 showing that the detecting unit with a wire.

When the circuit cannot work normally due to an external force being applied to the detecting unit such as being knocked, the signal detected or sent out from the signal processing unit (21) will be wrong. With reference to FIGS. 3 to 5, to fix the detecting unit, the detecting unit is first taken out from the tire. A wire (30) is attached to the air valve (11) with one end, and the other end of the wire (30) is extended into the housing (10) through the bore (201) in the cover (20) and is attached to the metal knob (201) on the circuit board (20). Accordingly, a low voltage will be sent to the reset terminal on the signal processing unit (21) from the ground (242) and through the air valve (11) and the wire (30), such that the signal processing unit (21) is reset. Consequently, the signal processing unit (20) can work in normal manner after being reset, and to replace the detecting unit with a new one is unnecessary. Thus, the cost for fixing the detecting unit is low.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A detecting unit for detecting pressure in a tire of a vehicle comprising:

a housing with a chamber defined in the housing;

a cover attached to the housing to close the chamber and having a bore defined in the cover;

an air valve attached to the housing and having an extension extending into the chamber of the housing;

a circuit board received in the chamber of the housing and having a circuit with a signal processing unit mounted on the circuit board;

a detecting assembly mounted on the circuit board to be adapted to measure pressure in one of the tires of the vehicle; and a ground mounted on the circuit board and electrically connected to the air valve, wherein the signal processing unit has a reset terminal corresponding to the bore in the cover so as to reset the signal processing unit when the reset is electrically connected to the air valve.

2. The detecting unit as claimed in claim 1, wherein the circuit board has a hole defined in the circuit board and aligning with the bore in the cover; and a metal knob is attached to the hole and is electrically connected to the reset terminal on the signal processing unit.

3. The detecting unit as claimed in claim 1, wherein the detecting assembly comprises:

a detector mounted in the signal processing unit; and a wireless transmitting unit mounted on the circuit on the circuit board and electrically connected to the detector; and a power supply electrically connected to the signal processing unit, wherein the ground connected to the air valve is mounted on the power supply.

4. The detecting unit as claimed in claim 3, wherein the wireless transmitting unit comprises:

an amplifier electrically connected to the detector;

an oscillating circuit electrically connected to the amplifier; and a transmitter electrically connected to the oscillating circuit.

5. The detecting unit as claimed in claim 1, wherein the housing has a through hole defined in the housing for the air valve being attached to the through hole.

6. The detecting unit as claimed in claim 1, wherein the extension on the air valve has a hole defined in a top of the extension; and a metal stub attached to the circuit board, electrically connected to the ground and pressed into the hole in the extension.

* * * * *